US012762905B2

(12) United States Patent
Hernandez et al.

(10) Patent No.: US 12,762,905 B2
(45) Date of Patent: Oct. 13, 2026

(54) DEVICE AND METHOD FOR MONITORING AT LEAST ONE VEHICLE IDENTIFICATION NUMBER

(71) Applicant: NAGRAVISION SARL, Cheseaux-sur-Lausanne (CH)

(72) Inventors: Juan-Ramon Hernandez, Cheseaux-sur-Lausanne (CH); Hardy Schmidbauer, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 46 days.

(21) Appl. No.: 18/565,205

(22) PCT Filed: Jun. 2, 2022

(86) PCT No.: PCT/EP2022/065073
§ 371 (c)(1),
(2) Date: Nov. 29, 2023

(87) PCT Pub. No.: WO2022/253968
PCT Pub. Date: Dec. 8, 2022

(65) Prior Publication Data

US 2024/0242547 A1 Jul. 18, 2024

(30) Foreign Application Priority Data

Jun. 3, 2021 (EP) .................................... 21177612

(51) Int. Cl.
*G07C 5/00* (2006.01)

(52) U.S. Cl.
CPC .................................. *G07C 5/008* (2013.01)

(58) Field of Classification Search
CPC ................................ G07C 5/008; B60R 25/33
See application file for complete search history.

(56) References Cited

U.S. PATENT DOCUMENTS

2008/0136611 A1* 6/2008 Benco ................ B60R 25/2018
340/426.3
2011/0313593 A1 12/2011 Cohen et al.
2017/0058811 A1* 3/2017 Misson ............... F02D 41/2487
2019/0206005 A1* 7/2019 Liu ..................... G06F 16/5846
2019/0274018 A1 9/2019 Mosenia et al.
2020/0369295 A1* 11/2020 Yang ................. B60W 60/0059
2020/0372583 A1* 11/2020 Yang ..................... B60W 50/10

FOREIGN PATENT DOCUMENTS

CN 109996235 A * 7/2019 .......... H04L 9/0866
JP 2005086749 A * 3/2005
WO WO 2016/054253 A1 4/2016

OTHER PUBLICATIONS

Machine Translation of CN109996235A (Year: 2019).*
Machine Translation of JP2005086749A (Year: 2005).*
International Search Report & Written Opinion issued Sep. 19, 2022 in PCT/EP2022/65073, filed on Jun. 2, 2022, 14 pages.

* cited by examiner

*Primary Examiner* — Brandon D Lee
(74) *Attorney, Agent, or Firm* — POLSINELLI LLP

(57) ABSTRACT

A device for monitoring at least one vehicle identification number sent by a dongle connected to an on-board diagnostics, hereafter OBD, port of a vehicle. The device is battery powered and wirelessly communicates with at least one dongle connected to an OBD port of a corresponding vehicle, and a backend server through a communication network.

16 Claims, 2 Drawing Sheets

DEVICE AND METHOD FOR MONITORING AT LEAST ONE VEHICLE IDENTIFICATION NUMBER

1. FIELD OF THE DISCLOSURE

The field of the disclosure is that of the access to vehicle's data.

More specifically, the disclosure relates to an electronic device configured for retrieving data from vehicles and sending it to a remote server.

The disclosure can be of interest in any field wherein accessing to vehicle's data is of interest, e.g. for being able to track the position of a vehicle when it is stollen, or to monitor a car stock for a professional.

2. TECHNOLOGICAL BACKGROUND

Electronic systems for accessing to vehicle's data are known. For instance, dongles that can be connected to an on-board diagnostics, hereafter OBD, port of a vehicle can communicate with an external device for providing data read from the vehicle. Such data can be for instance the status of the various vehicle sub-systems (real-time parameters, diagnostic trouble codes, engine status, etc.) following the OBD standards. Alternatively, the dongle can provide other data like the position of the vehicle in case e.g. a Global Positioning Specification, hereafter GPS, receiver is implemented in the vehicle.

However, OBD ports of vehicles are well-known so that such dongle can be found easily in the vehicle. Consequently, in case a vehicle is stolen, a thief can find the dongle without much efforts and disconnect it from the vehicle. in that case, there is no more possibility to access to the vehicle's data or to know its position.

There is thus a need for a solution for securing the access to the data of a vehicle or the tracking of the vehicle, e.g. even when the vehicle is stollen.

3. SUMMARY

A particular aspect of the present disclosure relates to a device for monitoring at least one vehicle identification number sent by a dongle connected to an on-board diagnostics, hereafter OBD, port of a vehicle. Such device is battery powered and comprises means for wirelessly communicating with:

- at least one dongle connected to an OBD port of a corresponding vehicle; and
- a backend server through a communication network.

Thus, the present disclosure proposes a new and inventive solution for securing the tracking of a vehicle, or the access to the data of such vehicle, the vehicle being identified by its vehicle identification number (also known as "chassis number" or "frame number") as defined e.g. in the International Organization for Standardization, hereafter ISO, standards 3779 and 4030.

More particularly, the proposed device is battery powered and communicates wirelessly so that there is no need for an electrical wired connection to the vehicle. Accordingly, the device can be implemented in the vehicle in a hidden place so that it cannot be found easily e.g. in case the vehicle is stollen. Even in such case, the data can thus still be accessed remotely from the vehicle through the communication with the backend server as long as the device is not discovered by the thief.

In some embodiments, the means for wirelessly communicating comprise a short-range communications transceiver for communicating with the at least one dongle. It can be e.g. a Bluetooth transceiver.

In some embodiments, the means for wirelessly communicating comprise a long-range communications transceiver for communicating with the backend server. It can be a transceiver according to a cellular network standard, e.g. a Third Generation Partnership Project, hereafter 3GPP, 2G, 3G, 4G or 5G cellular network.

In some embodiments, the device comprise a Global Navigation Satellite System receiver. It can be e.g. a Global Positioning Specification, hereafter GPS, a Galileo, a Glonass or a Beidou receiver.

In some embodiments, the device (according to any of the embodiments disclosed above) is implemented in a vehicle. The means for wirelessly communicating are configured for communicating with at least one dongle connected to an OBD port of the vehicle.

In some embodiments, the device is not electrically wired connected to the vehicle.

Thus, the device can be implemented in the vehicle in a hidden place so that it cannot be found easily e.g. in case the vehicle is stollen.

Another aspect of the present disclosure relates to a vehicle comprising a device as disclosed above (according to any of the embodiments disclosed above). The device is not electrically wired connected to the vehicle. The means for wirelessly communicating are configured for communicating with at least one dongle connected to an OBD port of the vehicle.

Another aspect of the present disclosure relates to a method for monitoring at least one vehicle identification number implemented by a device as disclosed above (according to any of the embodiments disclosed above). The method comprises:

- monitoring the at least one vehicle identification number sent by a dongle connected to an OBD port of a vehicle.

In some embodiments, the monitoring is implemented responsive to receiving, by the device, a request sent by the backend server for discovering vehicle identification number.

In some embodiments, the device sends to the backend server the at least one vehicle identification number received, during the monitoring, from a dongle connected to an OBD port of a vehicle.

In some embodiments, the device sends to the backend server additional data received from the dongle during the monitoring.

For instance, the additional data comprise data extracted from the vehicle providing e.g. status of the various vehicle sub-systems (real-time parameters, diagnostic trouble codes, engine status, etc.).

In some embodiments, the device receives back the vehicle identification number sent from the backend server for pairing the device to the vehicle.

In some embodiments, the device implements:

- receiving a given vehicle identification number sent from the backend server;
- receiving, during the monitoring, a vehicle identification number from a dongle connected to an OBD port of a corresponding vehicle; and
- comparing the given vehicle identification number and the vehicle identification number.

In some embodiments, the device implements sending an alarm to the backend server when the given vehicle identification number and the vehicle identification number are different vehicle identification numbers.

Thus, the device sends an alarm when it has been found and removed from the vehicle corresponding to the given vehicle identification number.

In some embodiments, the device sends to the backend server additional data received from the dongle during the monitoring.

In some embodiments, the device implements, during the monitoring, establishing a dedicated communication link with the dongle for receiving the vehicle identification number and/or the additional data sent by said dongle.

In some embodiments, the device implements sending an alarm to the backend server responsive to detecting that the dedicated communication link is broken.

In some embodiments, the monitoring is implemented periodically.

In some embodiments, the device comprises a Global Navigation Satellite System receiver and sends to the backend server geolocation data provided by the Global Navigation Satellite System receiver.

Thus, the position of the vehicle the device is implemented in can be tracked.

4. LIST OF FIGURES

Other features and advantages of embodiments shall appear from the following description, given by way of indicative and non-exhaustive examples and from the appended drawings, of which:

5. DETAILED DESCRIPTION

In all of the Figures of the present document, the same numerical reference signs designate similar elements and steps.

Figure 1:
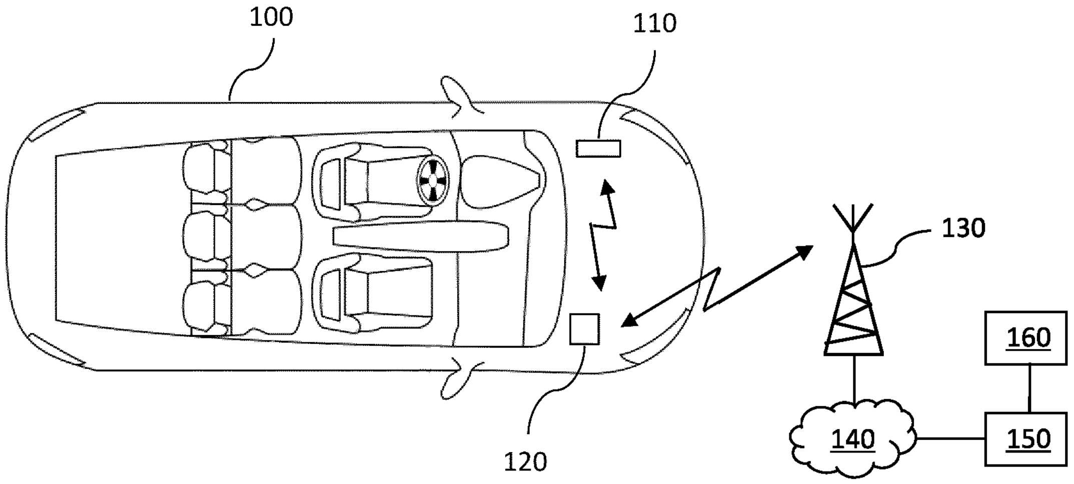
FIG. 1 illustrates a device implemented in a vehicle and configured for monitoring the vehicle identification number, hereafter VIN, sent by a dongle connected to an OBD port of the vehicle according to one embodiment of the present disclosure.

Referring now to FIG. 1, we describe a device 120 configured for monitoring a VIN sent by a dongle 110 connected to an OBD port of a vehicle 100 according to one embodiment of the present disclosure. An example of the structural blocks that can be implemented in the device 120 are further described in relation with FIG. 2.

The device 120 comprises a battery 205 and is thus battery powered. The device 120 further comprises means 204 for wirelessly communicating with:

- the dongle 110 connected to an OBD port of the vehicle 100; and
- a backend server 150 through the communication network 140.

More particularly, the means 204 for wirelessly communicating comprise a short-range communications transceiver for communicating with the dongle 110. It can be e.g. a Bluetooth transceiver.

In some embodiments, the device 120 is configured for wirelessly communicating with any dongle connected to an OBD port of a corresponding vehicle, and not only with the dongle 110 connected to an OBD port of the vehicle 100. This holds as long as such dongle is within the range of the short-range communications transceiver of the means 204 for wirelessly communicating.

Figure 2:
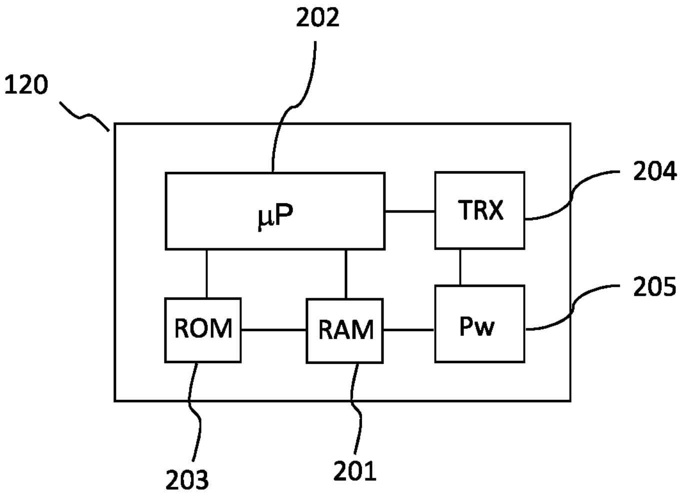
FIG. 2 illustrates an example of the structural blocks that can be implemented in the device of FIG. 1.

Back to FIGS. 1 and 2, the means 204 for wirelessly communicating comprise a transceiver according to long-range communications protocol. Such long-range communications may be a cellular network standard for communicating with the backend server 150 through the base station 130. It can be e.g. a Third Generation Partnership Project, hereafter 3GPP, 2G, 3G, 4G or 5G cellular network. In other embodiments, the transceiver for communicating with the backend server 150 implements another long-range communications standard, e.g. a narrowband standard dedicated to the internet of things (SigFox®, LoRa®, etc.).

Back to FIGS. 1 and 2, the device 120 is configured for monitoring the VIN of the vehicle 100 (or of the vehicles within the range of the short-range communications transceiver depending on the embodiments) and reporting it to the backend server 150. Such VIN is also known as "chassis number" or "frame number" as defined e.g. in the International Organization for Standardization, hereafter ISO, standards 3779 and 4030.

More generally, the device 120 is configured for implementing some of the steps of the method described below in relation with FIGS. 3, 4 and 5. Accordingly, in some embodiments, the device 120 reports to the backend server 150 additional data comprising data extracted from the vehicle 100 providing e.g. a status of the various vehicle sub-systems (real-time parameters, diagnostic trouble codes, engine status, etc.) or of the dongle 110 itself.

In some embodiments, the device 120 comprises a Global Navigation Satellite System, hereafter GNSS, receiver. It can be e.g. a Global Positioning Specification, hereafter GPS, a Galileo, a Glonass or a Beidou receiver. Accordingly, in some embodiments, the device 120 reports its position and/or corresponding geolocation data to the backend server 150.

Back to FIGS. 1 and 2, as discussed above, the device 120 is battery powered and communicates wirelessly with the vehicle 100. Consequently, the device 120 is not electrically wired connected to the vehicle 100. Accordingly, the device 120 can be implemented in the vehicle in a hidden place so that it cannot be found easily e.g. in case the vehicle 100 is stollen. Even in such case, the data can thus still be accessed remotely from the vehicle 100 through the communication with the backend server 150 as long as the device 120 is not discovered by the thief. The backend server 150 is further in communication (e.g. wireless or wired communication) with a terminal 160 (e.g. a smartphone, a computer, a tablet, etc.) so that a user can retrieve the data and/or control the device 120 by interacting with the terminal 160 as discussed below in relation with FIGS. 3, 4 and 5.

In FIG. 1, the vehicle 100 is represented in the form of a car. However, the device 120 can be implemented in any vehicle identified by its VIN and that comprises an ODB port (e.g. a truck).

In order to be able to implement the method discussed below in relation with FIGS. 3, 4 and 5 (according to any of the embodiments disclosed below), in some embodiments the device 120 also comprises:

- a non-volatile memory 203 (e.g. a read-only memory (ROM), a hard disk, a flash memory, etc.);

a volatile memory 201 (e.g. a random-access memory or RAM) and a processor 202.

The non-volatile memory 203 is a non-transitory computer-readable carrier medium. It stores executable program code instructions, which are executed by the processor 202 in order to enable implementation of some steps of the method described below (method for monitoring at least one VIN) in the various embodiment disclosed in relationship with below in relation with FIGS. 3, 4 and 5.

Upon initialization, the aforementioned program code instructions are transferred from the non-volatile memory 203 to the volatile memory 201 so as to be executed by the processor 202. The volatile memory 201 likewise includes registers for storing the variables and parameters required for this execution.

The steps of the method for monitoring at least one VIN may be implemented equally well:

- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or
- by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

In the embodiment of FIG. 1, the device 120 is implemented in the vehicle 100. However, in other embodiments, the device 120 is implemented in a distinct apparatus (e.g. a portable terminal) and is used to communicate with one (or more) dongle connected to a corresponding vehicle. In such implementations, the apparatus comprising the device 120 can be used as a tool e.g. for monitoring and/or retrieving data from various vehicles.

Figure 3:
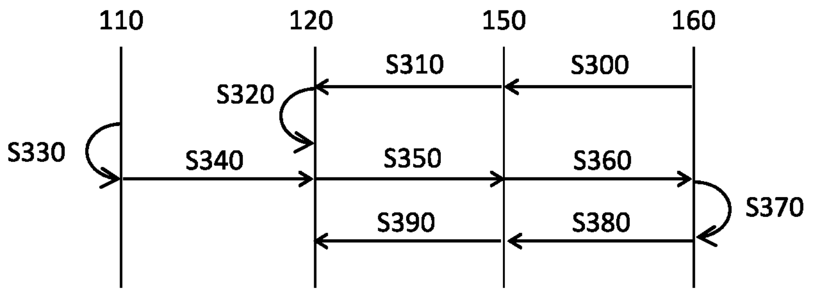
FIG. 3 illustrates a method for monitoring at least one VIN, implemented by the entities of FIG. 1, in the context of a first use case.

Referring now to FIG. 3, we describe a method for monitoring at least one VIN in the context of a first use case. Such method comprises steps implemented by the dongle 110, the device 120, the backend server 150 and the terminal 160.

More particularly, the first use case is directed to the pairing of the device 120 with the VIN of the vehicle 100 the device 120 is implemented in.

In that respect, in a step S300, the terminal 160 sends a request to the backend server 150 for discovering a VIN. For instance, the step S300 is implemented by the terminal 160 responsive to a user having selected or entered the VIN in an interface of the terminal 160.

Correspondingly, in step S300, the backend server 150 receives the request for discovering the VIN sent by the terminal 160.

In a step S310, responsive to receiving the request for discovering the VIN sent by the terminal 160, the backend server 150 forwards the request (or sends another corresponding request for discovering the VIN) to the device 120.

Correspondingly, in step S310, the device 120 receives the request for discovering the VIN sent by the backend server 150.

In a step S320, responsive to receiving the request for discovering the VIN sent by the backend server 150, the device 120 enters a monitoring phase until it detects the reception of a message from the dongle 110 carrying the VIN corresponding to the request.

In some embodiments, the monitoring phase can last for a predetermined duration at maximum so that if the VIN is not received within the predetermined duration, the device 120 ends the monitoring phase and sends an error message to the backend server 150.

In a step S340, the dongle 110 sends (or broadcasts as discussed below) a message carrying the VIN to the device 120. Such sending of the message may result of an action of the user on the dongle in a step S330. Such action can be e.g. pressing a dedicated button of the dongle 110 for having the dongle to broadcast the VIN of the vehicle 100. In other embodiments, the dongle 110 broadcasts e.g. periodically (e.g. proactively) the VIN of the vehicle 100 in step S340.

Back to FIG. 3, in step S340, the device 120 receives correspondingly the message carrying the VIN sent by the dongle 110.

In a step S350, responsive to receiving the message carrying the VIN sent by the dongle 110, the device 120 forwards the message carrying the VIN (or sends another corresponding message carrying the VIN) to the backend server 150.

Correspondingly, in step S350, the backend server 150 receives the message carrying the VIN sent by the device 120.

In a step S360, responsive to receiving the message carrying the VIN sent by the device 120, the backend server 150 forwards the message carrying the VIN (or sends another corresponding message carrying the VIN) to the terminal 160.

Correspondingly, in step S360, the terminal 160 receives the message carrying the VIN sent by the backend server 150.

In a step S370, the user confirms that the VIN received by the terminal 160 corresponds to the vehicle the device 120 has to be paired with. For instance, the VIN received by the terminal 160 is displayed on a screen of the terminal 160. The user thus checks the VIN and confirms the pairing by acting correspondingly on the interface of the terminal 160.

In a step S380, responsive to the confirmation of the pairing by the user, the terminal 160 sends a request to the backend server 150 for pairing the device 120 and the vehicle 100 (or equivalently for pairing the device 120 and the VIN of the vehicle 100). Such request may comprise the VIN of the vehicle 100.

Correspondingly, in step S380, the backend server 150 receives the request sent by the terminal 160 for pairing the device 120 and the vehicle 100.

In a step S390, responsive to receiving the request sent by the terminal 160 for pairing the device 120 and the vehicle 100 (or equivalently for pairing the device 120 and the VIN of the vehicle 100), the backend server 150 forwards the request (or sends another request for pairing the device 120 and the vehicle 100) to the device 120. Such request may comprise the VIN of the vehicle 100.

Correspondingly, in step S390, the device 120 receives the request sent by the backend server 150 for pairing the device 120 and the vehicle 100.

Thus, after the implementation of such pairing, the device 120 is associated with the VIN of the vehicle 100. For instance, this allows having the device 120 to monitor for VIN sent by dongles, whether upon request from the backend server 150 or periodically (e.g. proactively), and to check that the received VIN(s) match the VIN of the vehicle 100. This allows detecting for instance that the device 120 has been extracted from the vehicle 100, e.g. by a thief. Such use case is discussed more deeply below in relation with FIG. 4.

In some embodiments, the steps S300 to S380 are not implemented and only the step S390 is implemented for pairing the device 120 and the vehicle 100 based on the receiving, by the device 120, of a request sent by the backend server 150.

Conversely, in some embodiments, the step S390 is not implemented and the pairing of the device 120 and the vehicle 100 is done only at the level of the backend server 150. In such case, the device 100 sends back the monitored VIN(s) to the backend server 150. This allows the backend server 150 to check that the received VIN(s) match the VIN of the vehicle 100 the device 120 is paired with and thus that the device 120 has not been extracted from the vehicle 100.

In some embodiments, during step S340, the dongle 110 sends (or broadcasts as discussed below) additional data to the device 120. Such additional data may comprise e.g. data extracted from the vehicle 100 providing e.g. status of the various vehicle sub-systems (real-time parameters, diagnostic trouble codes, engine status, etc.). Such additional data may also comprise data relating to the status of the dongle 110, e.g. data representative of the correct connection of the dongle 110 to the ODB port of the vehicle 100. For instance, in case the dongle 110 is extracted from the ODB port of the vehicle 100, the dongle 110 may report an alert to the device 120 as additional data. Such alert may be forwarded as additional data by the device 120 to the backend server 150 when the device 120 does not detect any more the dongle 110 within the range of the means 204 for wirelessly communicating with dongles.

More generally, the additional data may be forwarded by the device 120 in addition to the VIN up to the backend server 150 (during step S350), and then up to the terminal 160 (step S360), e.g. for display to the user.

In some embodiments, the VIN and/or the additional data are broadcasted by the dongle 110 during step S340 (e.g. following a multicast scheme). In that case, the device 120 receives corresponding broadcasted messages sent by the dongle 110. In other embodiments, the device 120 establishes a dedicated communication link (e.g. following a unicast scheme) with the dongle 110. In that case, the device 120 receives corresponding dedicated messages (comprising e.g. a corresponding VIN and/or additional data) sent by the dongle 110. Such dedicated communication link may be secured, e.g. using an encryption scheme for such link.

In embodiments wherein a dedicated communication link is established between the device 120 and the dongle 110 during step S340, the device 120 may be configured for detecting a break (or drop) in such communication link with the dongle 110. Such break may e.g. be representative that a thief has disconnected the dongle 110 from the OBD port of the vehicle 100. In such case, the device 120 may send an alarm to the backend server 150 (e.g. during a step S420 as described below in relation with FIG. 4) responsive to the detection that the communication link is broken.

Figure 4:
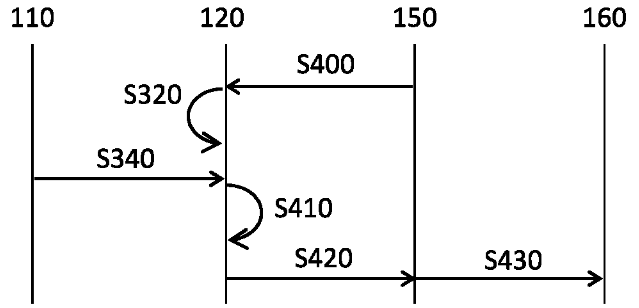
FIG. 4 illustrates the method for monitoring at least one VIN in the context of a second use case.

Referring now to FIG. 4, we describe the method for monitoring at least one VIN in the context of a second use case.

More particularly, the second use case is directed for instance to the checking that the device 120 is still implemented in the vehicle 100. Such checking can be implemented after the pairing of the device 120 with the vehicle 100 as disclosed above in relation with FIG. 3 or not.

For that, in a step S400, the device 120 receives from the backend server 150 a VIN, e.g. the VIN of the vehicle 100. In some embodiments, the VIN may be received through a request sent by the backend server 150 for pairing the device 120 and the vehicle 100. In that case, the step S400 may be identical to the step S390 of FIG. 3. In other embodiments, the VIN may be received through a dedicated request sent by the backend server 150.

Back to FIG. 4, after receiving the VIN, the device 120 enters a monitoring phase until it detects the reception of a message carrying a VIN sent from a dongle connected to an ODB port of a vehicle (steps S320 and S340 discussed above in relation with FIG. 3).

In a step S410, the device 120 verifies that the VIN sent by a dongle matches the VIN received from the backend server 150 during step S400, e.g. by comparison of the VINs. In case the VIN received from the dongle is different than the VIN received from the backend server 150, the device 120 generates an alarm. When the VIN received from the backend server 150 is the VIN of the vehicle 100 the device 120 is paired with, such alarm may be representative of the fact that the device 120 has been extracted from the vehicle 100, e.g. by a thief.

In a step S420, the device 120 sends a message carrying the alarm to the backend server 150.

Correspondingly, in step S420, the backend server 150 receives the message carrying the alarm sent by the device 120.

In a step S430, responsive to receiving the message carrying the alarm sent by the device 120, the backend server 150 forwards the message carrying the alarm (or sends another corresponding message carrying the alarm) to the terminal 160.

Correspondingly, in step S430, the terminal 160 receives the message carrying the alarm sent by the backend server 150.

The user is thus informed, e.g. by a display on a screen of the terminal 160, that a problem occurred with the device 120 (e.g. a theft).

In some embodiments discussed above in relation with FIG. 3, during step S340 additional data are received from monitored dongles. In such embodiments, such additional data may be forwarded by the device 120, in addition to the alarm, up to the backend server 150 (during step S420), and then up to the terminal 160 (step S430), e.g. for display to the user.

Figure 5:
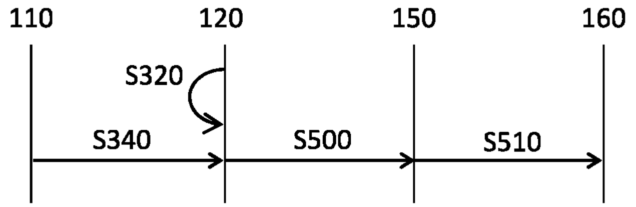
FIG. 5 illustrates the method for monitoring at least one VIN in the context of a third use case.

Referring now to FIG. 5, we describe the method for monitoring at least one VIN in the context of a third use case.

More particularly, the third use case is directed for instance to the detection of nearby vehicles through the monitoring of their VINs. Such detection can be implemented whereas the device 120 is already paired with a vehicle according to the first use case disclosed above in relation with FIG. 3 or not.

For that, the device 120 enters a monitoring phase (step S320 discussed above in relation with FIG. 3). Depending on the embodiments, such monitoring phase may be entered upon reception of a corresponding request from the backend server 150, or may be a default state of the device 120 unless otherwise instructed by the backend server 150 (i.e. a proactive monitoring).

Back to FIG. 5, in a step S500, each time during the monitoring the device 120 receives a message carrying a VIN sent from a dongle connected to an ODB port of a corresponding vehicle (step S340 discussed above in relation with FIG. 3), the device 120 sends a message carrying the VIN to the backend server 150.

Correspondingly, in step S500, the backend server 150 receives the message sent by the device 120 carrying the VIN.

In a step S510, responsive to receiving the message sent by the device 120 carrying the VIN, the backend server 150 forwards the message carrying the VIN (or sends another corresponding message carrying the VIN) to the terminal 160.

Correspondingly, in step S510, the terminal 160 receives the message carrying the VIN sent by the backend server 150.

The user is thus informed, e.g. by a display on the screen of the terminal 160, of the list of the VINs of vehicles within the range of the means 204 for wirelessly communicating with dongles.

In some embodiments discussed above in relation with FIG. 3, during step S340 additional data are received from monitored dongles. In such embodiments, such additional data may be forwarded by the device 120, in addition to the VINs, up to the backend server 150 (during step S500), and then up to the terminal 160 (step S510), e.g. for display to the user.

In some embodiments wherein the device 120 comprises a GNSS receiver, the additional data reported by the device 120 (steps S420 or S500) may comprise the position of the device 120 and/or corresponding geolocation data. The position and/or corresponding geolocation data may be forwarded by the backend server 150 to the terminal 160 (steps S430 or S510).

In the various use cases discussed above in relation with FIGS. 3, 4 and 5, the device 120 thus implements the monitoring of at least one VIN sent by a dongle connected to an OBD port of a vehicle. Such monitoring is responsive or not of the receiving, by the device 120, of a request sent by the backend server 150 for discovering VIN.

The invention claimed is:

1. A device for monitoring a vehicle, the device comprising:
- wireless circuitry;
- a battery for providing power for the device; and
- processing circuitry; where the processing circuitry is configured to:
  - establish, using the wireless circuitry, a wireless communication link with a dongle connected to an on-board diagnostics (OBD) port of the vehicle;
  - receive a message from the dongle including a vehicle identification number (VIN) of the vehicle;
  - wirelessly communicate, using the wireless circuitry, the VIN to a backend server through a communication network;
  - determine that the device has been removed from the vehicle based on a break in the wireless communication link between the device to the dongle; and
  - in response to determining that the device has been removed from the vehicle, send an alarm to the backend server, the alarm including the VIN.

2. The device of claim 1, wherein the wireless circuitry further includes a short-range or long-range communications transceiver for communicating with the dongle.

3. The device of claim 1, further comprising a Global Navigation Satellite System receiver for determining location information, the processing circuitry is configured to wirelessly communicate, using the wireless circuitry, the location information to the backend server through the communication network.

4. The device of claim 1, wherein the device is not electrically wired connected to said vehicle, and
- the wireless circuitry is configured for communicating with at least one dongle connected to the OBD port of the vehicle.

5. The device of claim 1, wherein the processing circuitry is further configured to periodically check whether the VIN matches a VIN of the vehicle previously stored by the device in a pairing process.

6. A method for monitoring a vehicle, the method comprising:
- establishing, by a device, a wireless communication link with a dongle connected to an on-board diagnostics (OBD) port of the vehicle;
- receiving, by the device, a message from the dongle including a vehicle identification number (VIN) of the vehicle;
- wirelessly communicating, by the device, the VIN to a backend server through a communication network;
- determining, by the device, that the device has been removed from the vehicle based on a break in the wireless communication link between the device to the dongle; and
- in response to determining that the device has been removed from the vehicle, sending, by the device, an alarm to the backend server, the alarm including the VIN.

7. The method of claim 6, wherein receiving the message from the dongle is implemented responsive to receiving, a request sent by the backend server for discovering.

8. The method of claim 6, further comprising wirelessly communicating additional data received from the dongle to the backend server.

9. The method of claim 6, further comprising receiving the VIN from the backend server for establishing the wireless communication link with the dongle.

10. The method of claim 6, wherein the VIN received in the message from the dongle comprises a first VIN, the method further comprising:
- receiving a second VIN from the backend server; and
- comparing said first VIN and the second VIN.

11. The method of claim 10 further comprising sending an alarm to the backend server in response to the first VIN and the second VIN being different.

12. The method of claim 10 further configured to send further comprising sending to the backend server additional data received from the dongle.

13. A non-transitory computer readable medium having stored thereon instructions that when executed by processing circuitry causes the processing circuitry to implement a method for monitoring at least one vehicle identification number, the method comprising:
- establishing, by a device, a wireless communication link with a dongle connected to an on-board diagnostics (OBD) port of a vehicle;
- receiving, by a device, a message from the dongle including a vehicle identification number (VIN) of the vehicle;
- wirelessly communicating, by a device, the VIN to a backend server through a communication network;
- determining, by a device, that the device has been removed from the vehicle based on a break in the wireless communication link between the device to the dongle; and
- in response to determining that the device has been removed from the vehicle, sending, by a device, an alarm to the backend server, the alarm including the VIN.

14. The non-transitory computer readable medium of claim 13, wherein receiving the message from the dongle is implemented responsive to receiving a request sent by the backend server for discovering the VIN.

15. The non-transitory computer readable medium of claim 13, wherein the instructions, when executed by the processing circuitry, cause the processing circuitry to send to the backend server additional data received from the dongle.

16. The non-transitory computer readable medium of claim 13, wherein the instructions, when executed by the processing circuitry, cause the processing circuitry to receive the VIN from the backend server for establishing the wireless communication link with the dongle.

* * * * *